United States Patent
Dianetti

[15] 3,693,416
[45] Sept. 26, 1972

[54] APPLANATION TONOMETER ARRANGEMENT

[72] Inventor: Joseph C. Dianetti, East Aurora, N.Y.

[73] Assignee: American Optical Corporation, Southbridge, Mass.

[22] Filed: Nov. 25, 1970

[21] Appl. No.: 92,852

Related U.S. Application Data

[63] Continuation of Ser. No. 789,790, Oct. 8, 1969, abandoned.

[52] U.S. Cl. .......................... 73/80, 350/39, 351/14
[51] Int. Cl. ........ A61b 3/16, A61b 3/10, G02b 7/04, G02b 15/02
[58] Field of Search ....... 73/80; 350/39, 254; 351/11, 351/14

[56] References Cited

UNITED STATES PATENTS

| | | |
|---|---|---|
| 3,446,061 | 5/1969 | Draeger et al. ................. 73/80 |
| 3,470,736 | 10/1969 | Bartlay ........................... 73/80 |
| 2,565,419 | 8/1951 | Aitcheson .............. 350/254 X |

Primary Examiner—James J. Gill
Assistant Examiner—C. E. Snee, III
Attorney—William C. Nealon, Nobles Williams and Robert J. Bird

[57] ABSTRACT

An applanation tonometer having a bi-prism to indicate the displacement of the contact element against a corneal surface. The bi-prism is located at the entrance pupil of the associated optical system.

1 Claim, 4 Drawing Figures

PATENTED SEP 26 1972 3,693,416

INVENTOR.
JOSEPH C. DIANETTI
BY Robert J. Bird
ATTORNEY

APPLANATION TONOMETER ARRANGEMENT

This application is a continuation of Ser. No. 789,790, filed Oct. 8, 1969, now abandoned.

BACKGROUND OF THE INVENTION

The present invention is related to an applanation tonometer. More specifically, the invention concerns an applanation tonometer in which the corneal applanated area is indicated by doubling its image by means of a bi-prism.

It is known in the art of tonometry that a corneal contact element may be biased against a corneal surface to applanate an area of given diameter and that such diameter may be determined by the use of an associated bi-prism. The purpose of the bi-prism is to insure that the applanated corneal area is controlled to a certain diameter, 3.06 mm being conventional in tonometry. The bi-prism operates to double the image of the applanated area. By careful control of the angles and dimensions, the bi-prism can be designed such that the double circular images of the applanated area are exactly tangent to each other when their object (the applanated area) is a circle of 3.06 mm diameter.

In the prior art, such bi-prisms are generally made integral with and located adjacent to the contact element. The effect of this close physical positioning of the applanated area and the bi-prism is that positioning of the contact element relative to the corneal surface must be precisely controlled. In other words, a small displacement of the contact element (and bi-prism) relative to the applanated area under observation causes the loss of the essential part of the two image circles. In this event, it is no longer possible to determine the tangencies of the circles and hence to determine the existence of the desired 3.06 mm diameter applanated area.

It is an object of the present invention to provide an applanation tonometer which is adjusted relative to the cornea by means of a bi-prism and which is less adversely affected by slight misalignments of the apparatus relative to the eye.

Other objects, advantages and features of the present invention will become apparent from the following description of one embodiment thereof taken in connection with the accompanying drawing.

SUMMARY OF THE INVENTION

Briefly, the present invention is practiced in one form by an applanation tonometer apparatus arranged for mounting as an integral part of a slit lamp. The tonometer includes a transparent contact element adapted to be placed in contact with a corneal surface. Separate from the contact element and disposed adjacent to the entrance pupil of the optical system, is a bi-prism for doubling the image of the corneal area which is applanated by the contact element. As the applanated area grows, the double images grow until they meet tangentially. At this point, the applanated circular area has a desired diameter of 3.06 mm.

DRAWINGS

DESCRIPTION

Figure 1:
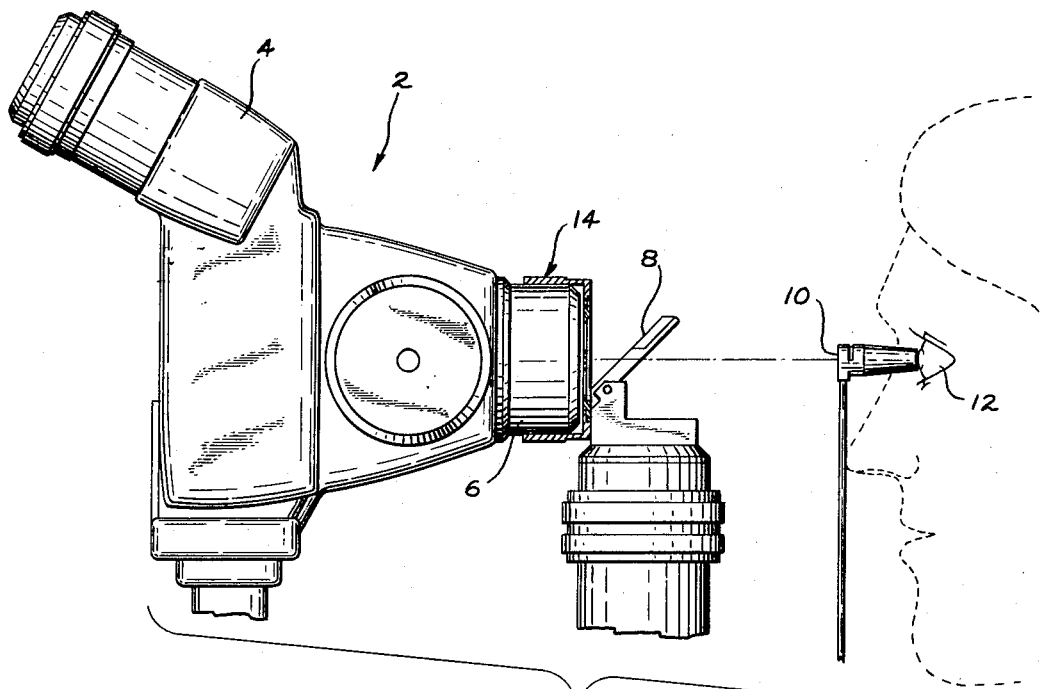
FIG. 1 is an overall view showing the general arrangement and environment of a tonometer apparatus according to the present invention.

Referring now to FIG. 1, there is shown a part of a slit lamp apparatus including a stereomicroscope 2 which includes eyepieces 4 and an objective 6. Objective 6 is optically aligned with a mirror 8 and also with a corneal contact element 10. Contact element 10 is positioned so as to be biased against a patient's corneal surface, represented at 12. A source of light, not shown, projects light upward and into the system to mirror 8 from which it is reflected toward corneal surface 12. Mirror 8 is disposed in the optical axis but is configured to permit a viewer to see from the microscope 2 to the corneal contact element 10, as is known in the art.

Contact element 10 is made of some transparent material such as glass or plastic. When contact element 10 is urged against the corneal surface 12, by a biasing means not shown, the surface 12 is thereby caused to deform or applanate. The applanated area can be seen through element 10 and objective 6. Increasing or decreasing size of the applanated area indicates respectively increasing or decreasing biasing force against the surface by the contact element 10. It is desired to applanate a circular area of diameter 3.06 mm and to measure the biasing force required to applanate such an area.

Figure 2:
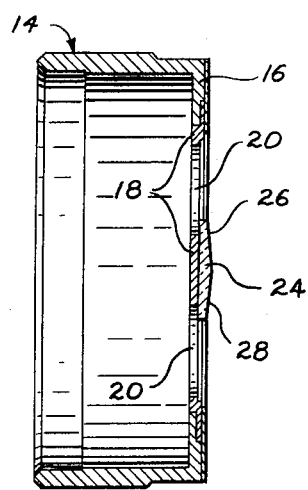
FIG. 2 is a side view, partly in section, of a detail from FIG. 1.
Figure 3:
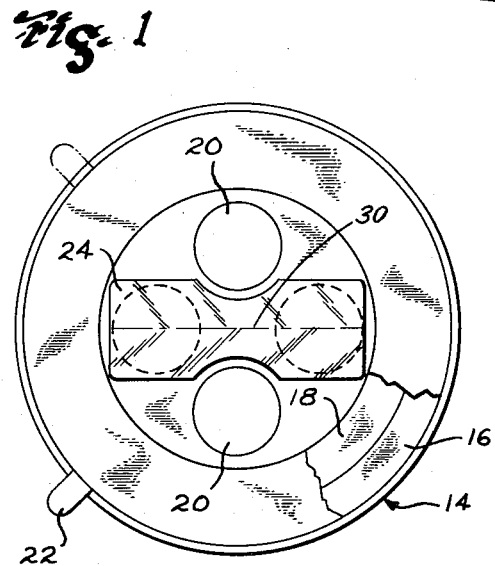
FIG. 3 is a front view of the detail of FIG. 2.

There is rotatably mounted on the objective 6 a cup-shaped element or prism mount assembly 14. Element 14 is better shown in FIGS. 2 and 3, and includes a circumferential flange 16 to which is mounted an apertured plate 18. Plate 18 has four holes, spaced 90° apart, formed therethrough. Element 14 is rotatable relative to objective 6 by means of a handle 22.

A bi-prism 24 is mounted on plate 18. The bi-prism is mounted over two of the apertures 20 so as to be in the optical path of objective 6 and such that its apex passes through the axis of each of the two apertures. Bi-prism 24 has faces 26 and 28 which are slightly inclined from each other.

Figure 4:
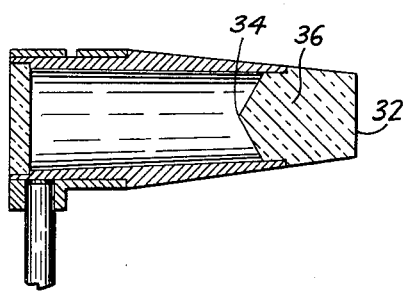
FIG. 4 is a side view of a typical contact element and bi-prism of the prior art.

In operation, when contact element 10 is biased against a corneal surface 12, creating a circular applanated area, the image of this area can be viewed through transparent contact element 10 and through bi-prism 24 and microscope 2. The bi-prism causes a doubling of the image, and the angles are such that the two circular images are tangent to each other when their object, the applanated circular area, has a diameter of 3.06 mm. The distance between corneal contact surface 12 and the apex 30 of bi-prism 24 is on the order 100 mm, and the angle subtended by the images relative to their object is on the order of 2°. At this distance, a very small angle need separate prism faces 26 and 28 to effect the doubling of an image of about 3 mm, as compared to the situation FIG. 4 where the distance between corneal contact surface 32 and prism apex 34 on the single transparent bi-prism element 36 is on the order of 10 mm. The effect of this is that the prism located at the much greater distance from the contact surface (object) is not so adversely affected by slight misalignments of the contact element with the corneal surface.

Because of the fact that fine alignment is not so critical, it is no longer necessary in the use of this bi-prism arrangement to make final adjustments in the position of the contact element on the cornea while examining the applanated area through the slit lamp. Thus, a certain amount of discomfort in the use of the prior art applanation tonometers has been eliminated.

It may occur to others of ordinary skill in the art to make modifications of the present invention which will lie within the concept and scope thereof and not constitute a departure therefrom. Accordingly, it is intended that the invention be not limited by the details in which it has been described, but that it compass all within the purvue of the following claims.

I claim:

1. A combination slit lamp and applanation tonometer:
   said tonometer being removably attached to said slit lamp including,
   a transparent corneal contact element adapted to be biased against a corneal surface,
   a prism for doubling the image of the area of contact between said contact element and said corneal surface, said prism having its apex defined by prism faces disposed in equal angular orientation relative to the optical axis between said prism and said contact element,
   said slit lamp including a stereo optical system defining a pair of optical paths converging at said contact element and effective to observe the area of contact between said contact element and said corneal surface,
   said optical system including at least one objective lens,
   said prism being mounted adjacent to said objective lens on a cup-like element which is rotatably mounted relative to said objective lens, so that said prism is rotatable between alternate positions in and out of said optical paths,
   said cup-like element defining four apertures on parallel axes and spaced 90° apart in a circumferencial array, said prism being mounted over two diagonally opposed apertures and being clear of the remaining two said apertures,
   said cup-like element being rotatable between end positions 90° apart.

* * * * *